(12) United States Patent
Turner

(10) Patent No.: US 11,673,544 B2
(45) Date of Patent: Jun. 13, 2023

(54) AUTO PARK HUMAN MACHINE INTERFACE DISPLAY BASED CONTROL

(71) Applicant: Panasonic Automotive Systems Company of America, Division of Panasonic Corporation of North America, Peachtree City, GA (US)

(72) Inventor: Donald Allen Turner, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 87 days.

(21) Appl. No.: 17/234,903

(22) Filed: Apr. 20, 2021

(65) Prior Publication Data

US 2021/0309211 A1 Oct. 7, 2021

Related U.S. Application Data

(63) Continuation of application No. 16/115,915, filed on Aug. 29, 2018, now Pat. No. 11,110,915.

(60) Provisional application No. 62/552,655, filed on Aug. 31, 2017.

(51) Int. Cl.
| | |
|---|---|
| *B60W 30/06* | (2006.01) |
| *G05D 1/00* | (2006.01) |
| *G06F 3/04817* | (2022.01) |
| *G06F 3/0482* | (2013.01) |
| *B60W 50/14* | (2020.01) |
| *G06V 20/58* | (2022.01) |
| *H04N 23/54* | (2023.01) |

(52) U.S. Cl.
CPC ............ *B60W 30/06* (2013.01); *B60W 50/14* (2013.01); *G05D 1/0088* (2013.01); *G06F 3/0482* (2013.01); *G06F 3/04817* (2013.01); *G06V 20/586* (2022.01); *H04N 23/54* (2023.01); *B60K 2370/1438* (2019.05); *B60W 2050/146* (2013.01)

(58) Field of Classification Search
CPC ................. B60W 30/06; B60W 50/14; B60W 2050/146; G05D 1/0088; G06F 3/04817; G06F 3/0482; G06V 20/586; H04N 5/2253; B60K 2370/1438
See application file for complete search history.

(56) References Cited

U.S. PATENT DOCUMENTS

| | | | | |
|---|---|---|---|---|
| 5,757,359 | A | * | 5/1998 | Morimoto ............... G01C 21/36 345/173 |
| 11,110,915 | B2 | * | 9/2021 | Turner ................... B60W 30/06 |

(Continued)

*Primary Examiner* — Donald J Wallace
(74) *Attorney, Agent, or Firm* — Laurence S. Roach, Esq.

(57) ABSTRACT

An autonomous parking arrangement for a motor vehicle includes at least one camera associated with the vehicle and capturing images of parking spaces surrounding the vehicle. An electronic processor is communicatively coupled to the at least one camera and processes the captured images. A touch-sensitive display screen is communicatively coupled to the electronic processor and displays the processed images. The display screen enables a user of the motor vehicle to select a parking space in the processed images by touching the display screen. The display screen indicates to the electronic processor which of the parking spaces has been selected by the user.

20 Claims, 4 Drawing Sheets

(56) References Cited

U.S. PATENT DOCUMENTS

| | | | |
|---|---|---|---|
| 2005/0060073 A1* | 3/2005 | Tanaka | B62D 15/0285 |
| | | | 340/932.2 |
| 2008/0136673 A1* | 6/2008 | Jung | G08G 1/168 |
| | | | 340/932.2 |
| 2009/0251334 A1* | 10/2009 | Yoshihashi | B60W 50/14 |
| | | | 340/932.2 |
| 2013/0265428 A1* | 10/2013 | Yoon | H04N 7/183 |
| | | | 348/148 |
| 2014/0121883 A1* | 5/2014 | Shen | B62D 15/0285 |
| | | | 701/28 |
| 2014/0292692 A1* | 10/2014 | Okuyama | G06F 3/038 |
| | | | 345/173 |
| 2017/0076603 A1* | 3/2017 | Bostick | G06V 20/586 |
| 2017/0355307 A1* | 12/2017 | Ha | G08G 1/143 |
| 2018/0129218 A1* | 5/2018 | Kato | G05D 1/0088 |
| 2019/0066503 A1* | 2/2019 | Li | G08G 1/012 |
| 2020/0189570 A1* | 6/2020 | Yamanaka | G08G 1/146 |

\* cited by examiner

AUTO PARK HUMAN MACHINE INTERFACE DISPLAY BASED CONTROL

CROSS-REFERENCE TO RELATED APPLICATIONS

This application is a continuation of U.S. patent application Ser. No. 16/115,915, filed on Aug. 29, 2018, which is currently under allowance, which claims benefit of U.S. Provisional Application No. 62/552,655 filed on Aug. 31, 2017, which the disclosure of which are hereby incorporated by reference in their entirety for all purposes.

FIELD OF THE INVENTION

The disclosure relates to an autonomous parking system in a motor vehicle.

BACKGROUND OF THE INVENTION

In situations with multiple parking possibilities, an autonomous parking system within a vehicle may not be able to infer which parking space is desired by the driver. Current systems utilize the turn signal switch to indicate only if the driver's desire is to park to the left or the right. These systems do not allow for front, rear or other angles to be indicated.

SUMMARY

The present invention may provide a control switch in a vehicle to indicate the location of a desired parking space to improve the accuracy of an autonomous parking system. The driver may activate the inventive control switch to indicate to the autonomous parking system which parking space is desired.

Optionally, an exterior camera or cameras could be used to identify available parking spaces and highlight the directions of the parking space on the control switch. A display utilizing imaging from vehicle exterior cameras could be used to identify a desired parking location.

The invention may also provide a display-based view of potential parking locations with a touch screen control in a vehicle to enable a driver to indicate and select the location of a desired parking space, thereby improving the accuracy of the autonomous parking system. The driver can utilize a display screen with touch screen control and showing potential parking locations to provide the autonomous parking system with an identification of a desired parking space.

Predefined preferences can also be added to the system such as handicap parking space desirability, acceptable parking space length and width (corresponding to vehicle size), whether the vehicle is towing a trailer to identify an appropriate parking space, first available space versus larger space, etc. The inventive system could also be in communication with cloud-based parking space availability detection systems as those infrastructure systems are installed.

In one embodiment, the invention comprises an autonomous parking arrangement for a motor vehicle, including at least one camera associated with the vehicle and capturing images of parking spaces surrounding the vehicle. An electronic processor is communicatively coupled to the at least one camera and processes the captured images. A touch-sensitive display screen is communicatively coupled to the electronic processor and displays the processed images. The display screen enables a user of the motor vehicle to select a parking space in the processed images by touching the display screen. The display screen indicates to the electronic processor which of the parking spaces has been selected by the user.

In another embodiment, the invention comprises an autonomous parking method for a motor vehicle, including capturing images of parking spaces surrounding the vehicle. The captured images are processed. The processed images are displayed on a touch-sensitive display screen. A user of the motor vehicle is enabled to select a parking space in the processed images by touching the display screen. The motor vehicle is autonomously parked in the parking space that has been selected by the user.

In yet another embodiment, the invention comprises a motor vehicle including at least one camera capturing first images of parking spaces surrounding the vehicle. A touch-sensitive display screen displays second images based on the first images. The second images include a plurality of areas each corresponding to an open parking space in the first images. An autonomous parking system autonomously parks the vehicle in a selected open parking space corresponding to one of the areas on the display screen after the one area has been touched by a user of the vehicle.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
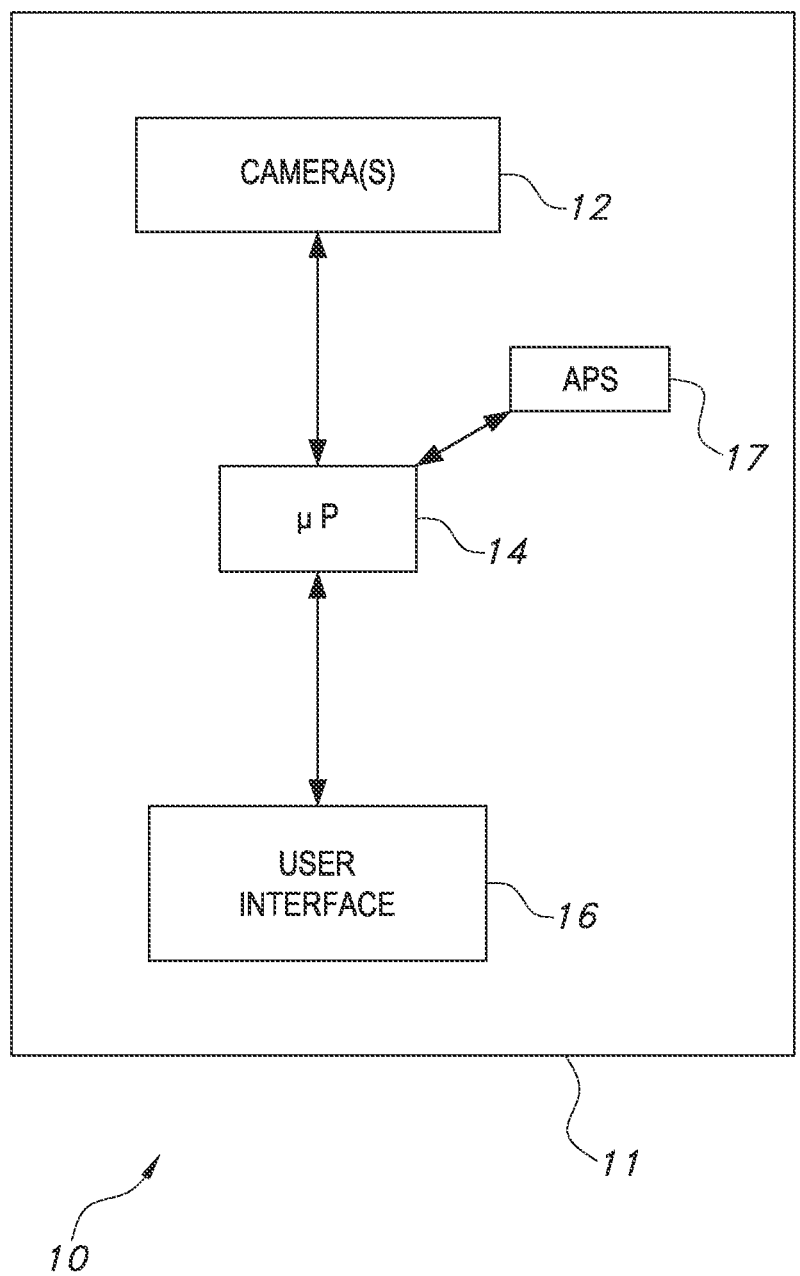
FIG. 1 is a block diagram of one example embodiment of an autonomous parking arrangement of the present invention for a motor vehicle.

FIG. 1 illustrates one example embodiment of an autonomous parking arrangement 10 of the present invention associated with a vehicle 11. Autonomous parking arrangement 10 includes one or more cameras 12, an electronic processor 14, and a user interface 16. Camera(s) 12 are in bi-directional communication with electronic processor 14, and electronic processor 14 is in bi-directional communication with user interface 16. Camera(s) 12 may capture images of parking spaces surrounding vehicle 11 and transmit the images to processor 14. Processor 14 may process the received images and present parking information to the driver on user interface 16. Processor 14 may also be in bi-directional communication with an autonomous parking system 17.

Figure 2:
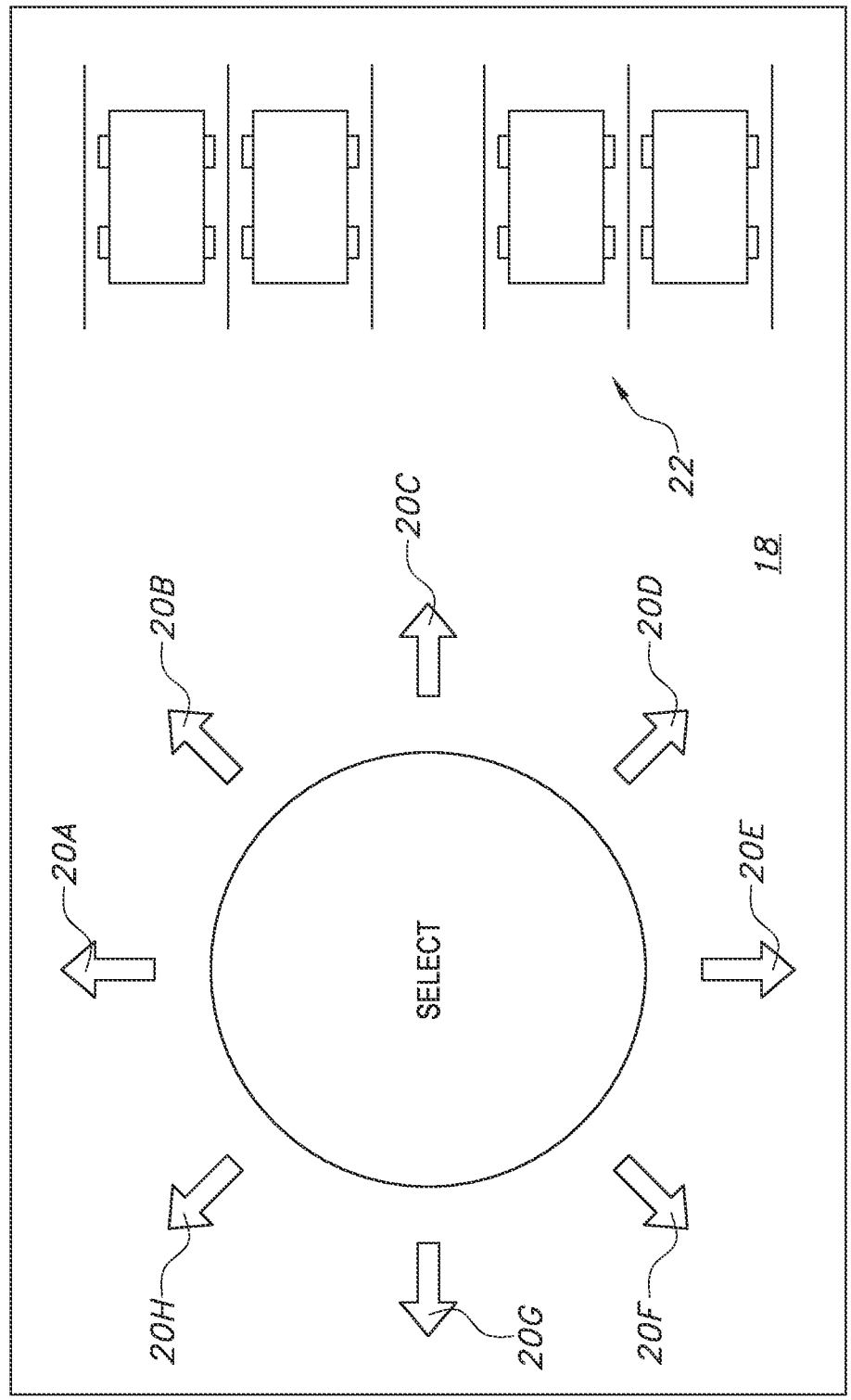
FIG. 2 is a plan view of one embodiment of a display screen of the user interface of the autonomous parking arrangement of FIG. 1, and an example image presented thereon.

FIG. 2 illustrates one specific embodiment of user interface 16, including a touch sensitive display screen 18. Displayed on screen 18 are eight touch-sensitive and selectable arrows 20a-h each pointing in a respective one of eight evenly-spaced directions. In response to the driver touching arrow 20c, which points in a rightward direction, processor 14 presents an image 22 of the parking spaces to the right of vehicle 11, and the cars disposed in the parking spaces. The presented image 22 may be based on images captured by camera(s) 12. Image 22 may be presented on a same side of display screen 18 as is pointed to by the selected arrow 20. In order to make room for the image 22 on the same side of display screen 18 as is pointed to by the selected arrow 20, the group of arrows 20*a-h* may be moved to a side of display screen that is opposite to the direction of the selected arrow 20. Thus, if the driver selects arrow 20*e*, the group of arrows 20*a-h* may be moved to the top of screen 18 and image 22 may be displayed on the bottom of screen 18. Although screen 18 is shown as rectangular in FIG. 2, it is to be understood that the display screen may have a square shape to provide flexibility in the placement of arrows 20*a-h* and image 22.

After the selected arrow 20 has been touched by the driver, autonomous parking system 17 may then autonomously park vehicle 11 in the open parking space to the right of vehicle 11. In one embodiment, after the image of the parking spaces to the right of vehicle 11 is presented on display screen 18, the driver must confirm that he wants to park in the displayed parking space before autonomous parking system 17 autonomously parks vehicle 11. For example, the driver may touch arrow 20*c* a second time in order to cause autonomous parking system 17 to autonomously park vehicle 11.

Figure 3:
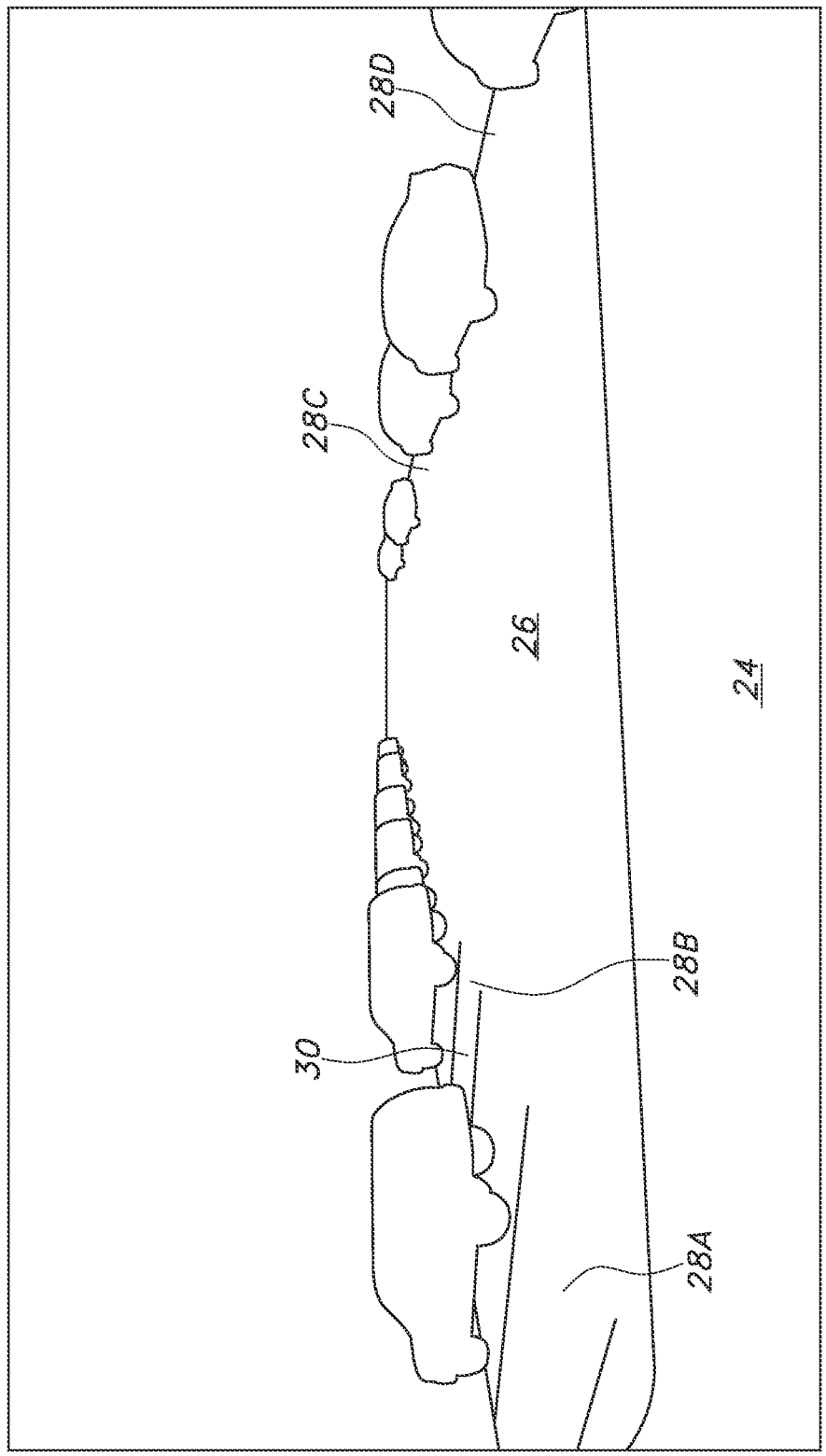
FIG. 3 is a plan view of another example image presented on the display screen of FIG. 2.

FIG. 3 illustrates another example image that may be presented on display screen 18 and that may be captured by a camera 12 mounted on a dashboard 24 of vehicle 11. The image is of a street 26 that vehicle 11 is traveling on, and includes open or unoccupied parking spaces 28*a-d*. After the driver has decided upon one of parking spaces 28*a-d* in which to park vehicle 11, the driver may touch the portion of the image on display screen 18 that corresponds to the desired and decided upon parking space. For example, if the driver decides upon parking space 28*b* in which to park vehicle 11, then the driver may touch screen 18 at point 30 in order to communicate to processor 14 that the driver would like to park vehicle 11 in parking space 28*b*. That is, the touch sensitive screen 18 may detect the touching of screen 18 at point 30, and may inform processor 14 of the touching of screen 18 at point 30. In response to learning that screen 18 has been touched at point 30, processor 14 may cause vehicle 11 to be autonomously parked in parking space 28*b*.

In one embodiment, in response to learning that screen 18 has been touched at point 30, processor 14 may highlight parking space 28*b* on screen 18 and ask the driver for confirmation that he would like vehicle 11 parked in parking space 28*b*. This request for confirmation may be audibly played on loudspeakers within vehicle 11, or presented as text on screen 18. Only after the driver has confirmed that he would like vehicle 11 parked in parking space 28*b*, such as orally (as detected by a microphone within vehicle 11) or by further touching of display screen 18, may processor 14 cause vehicle 11 to be autonomously parked in parking space 28*b*.

The invention has been described as enabling a user to touch an image on a display screen to indicate a location of a parking space he desires. However, it is also possible within the scope of the invention for the driver to actuate a multi-position switch to indicate a desired parking spot location.

Figure 4:
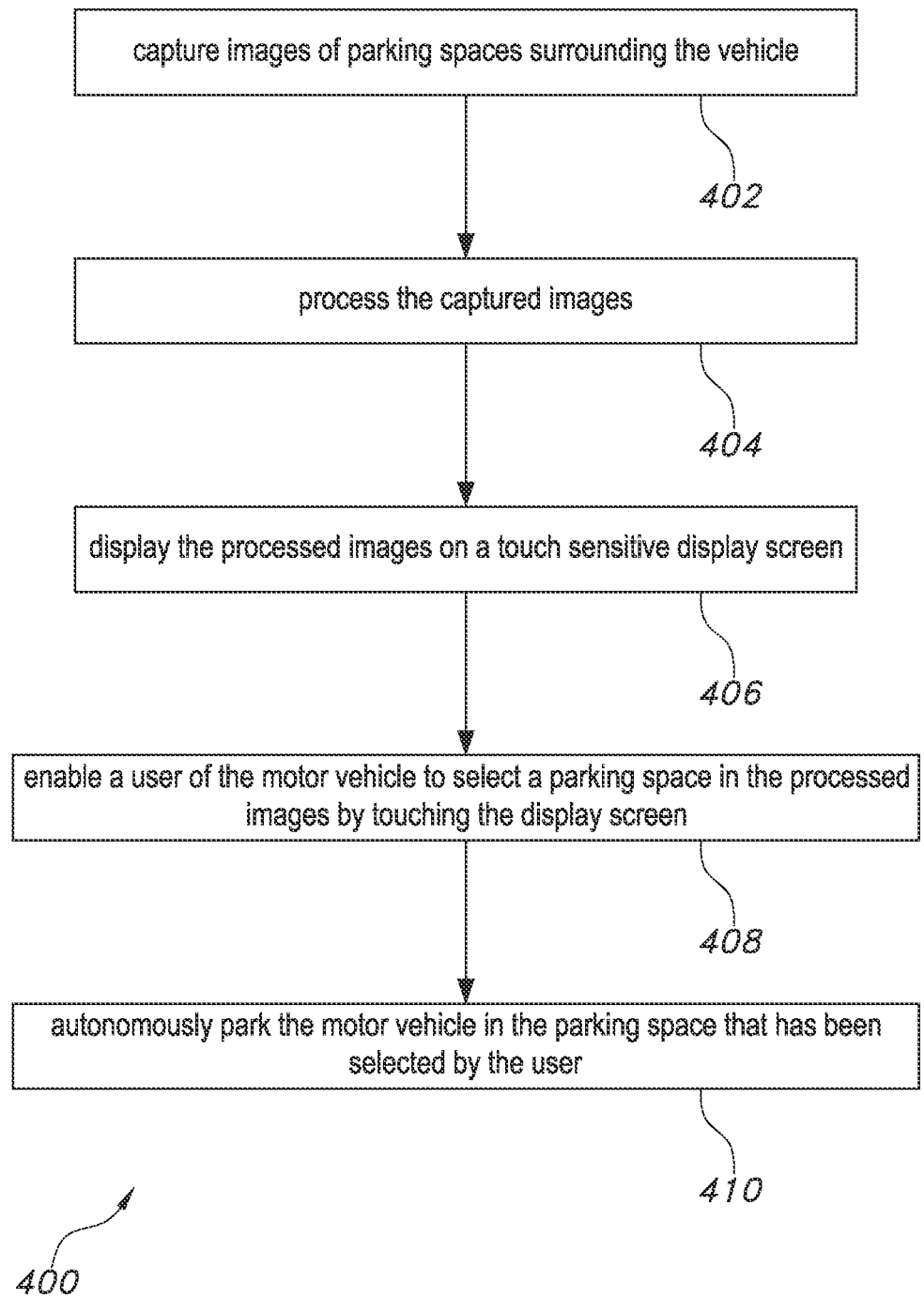
FIG. 4 is a flow chart of one embodiment of an autonomous parking method of the present invention for a motor vehicle.

FIG. 4 illustrates one embodiment of an autonomous parking method 400 of the present invention for a motor vehicle. In a first step 402, images of parking spaces surrounding the vehicle are captured. For example, camera(s) 12 may capture images of parking spaces surrounding vehicle 11.

Next, in step 404, the captured images are processed. For example, processor 14 may process the images received from camera(s) 12.

In a next step 406, the processed images may be displayed on a touch-sensitive display screen. For example, the images processed by processor 14 may be displayed on touch sensitive display screen 18.

In step 408, a user of the motor vehicle is enabled to select a parking space in the processed images by touching the display screen. For example, the driver may touch screen 18 at point 30 in order to communicate to processor 14 that the driver would like to park vehicle 11 in parking space 28*b*.

In a final step 410, the motor vehicle is autonomously parked in the parking space that has been selected by the user. For example, in response to learning that screen 18 has been touched at point 30, processor 14 may cause vehicle 11 to be autonomously parked in parking space 28*b*.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An autonomous parking arrangement for a motor vehicle, the arrangement comprising:
    at least one camera associated with the vehicle and configured to capture images of parking spaces surrounding the vehicle;
    an electronic processor communicatively coupled to the at least one camera and configured to process the captured images; and
    a touch-sensitive display screen communicatively coupled to the electronic processor and configured to:
        display the processed images;
        display a plurality of arrows each pointing in a different, respective direction;
        enable the user of the motor vehicle to select the parking space in the processed images by touching one of the arrows that points in a direction of the selected parking space, wherein, in response to the touching of the one arrow, the arrows are moved to a side of the display screen opposite to a direction in which the touched arrow points, and the images of the parking spaces are moved to a side of the display screen to which the touched arrow points; and
        indicate to the electronic processor which of the parking spaces has been selected by the user.

2. The autonomous parking arrangement of claim 1 wherein the arrows point in evenly spaced directions.

3. The autonomous parking arrangement of claim 1 wherein the arrows point in eight evenly spaced directions.

4. The autonomous parking arrangement of claim 1 wherein the processed images can be presented on a side of the display screen opposite from the direction in which the touched arrow points.

5. The autonomous parking arrangement of claim 1 further comprising an autonomous parking system configured to autonomously park the vehicle in the selected parking space.

6. The autonomous parking arrangement of claim 5 wherein the electronic processor is configured to indicate to the autonomous parking system which of the parking spaces has been selected by the user.

7. The autonomous parking arrangement of claim 1 wherein the touch-sensitive display screen is configured to enable the user of the motor vehicle to select the parking space in the processed images by touching an area on the screen that corresponds to the parking space that the user would like to select.

8. An autonomous parking method for a motor vehicle, the method comprising:
capturing images of parking spaces surrounding the vehicle;
processing the captured images;
displaying the processed images on a touch-sensitive display screen;
displaying a plurality of arrows each pointing in a different, respective direction;
enabling the user of the motor vehicle to select a parking space in the processed images by touching one of the arrows that points in a direction of the selected parking space, wherein, in response to the touching of the one arrow, the arrows are moved to a side of the display screen opposite to a direction in which the touched arrow points, and the images of the parking spaces are moved to a side of the display screen to which the touched arrow points; and
autonomously parking the motor vehicle in the parking space that has been selected by the user.

9. The autonomous parking method of claim 8, wherein the arrows point in evenly spaced directions.

10. The autonomous parking method of claim 9 wherein the arrows point in eight evenly spaced directions.

11. The autonomous parking method of claim 9 further comprising presenting the processed images on a side of the display screen opposite from the direction in which the touched arrow points.

12. The autonomous parking method of claim 8 further comprising enabling the user of the motor vehicle to select the parking space in the processed images by touching an area on the screen that corresponds to the parking space that the user would like to select.

13. The autonomous parking method of claim 12 further comprising indicating to an autonomous parking system which of the parking spaces has been selected by the user.

14. The autonomous parking method of claim 8 wherein the arrows are displayed on the touch-sensitive display screen.

15. A motor vehicle, comprising:
at least one camera associated with the vehicle and configured to capture images of parking spaces surrounding the vehicle;
an electronic processor communicatively coupled to the at least one camera and configured to process the captured images;
a touch-sensitive display screen communicatively coupled to the electronic processor and configured to:
display the processed images;
display a plurality of arrows each pointing in a different, respective direction;
enable the user of the motor vehicle to select the parking space in the processed images by touching one of the arrows that points in a direction of the selected parking space, wherein, in response to the touching of the one arrow, the arrows are moved to a side of the display screen opposite to a direction in which the touched arrow points, and the images of the parking spaces are moved to a side of the display screen to which the touched arrow points; and
indicate to the electronic processor which of the parking spaces has been selected by the user; and
an autonomous parking system configured to autonomously park the vehicle in the selected parking space.

16. The motor vehicle of claim 15 wherein the arrows point in evenly spaced directions.

17. The motor vehicle of claim 15 wherein the arrows point in eight evenly spaced directions.

18. The motor vehicle of claim 15 wherein the processed images can be presented on a side of the display screen opposite from the direction in which the touched arrow points.

19. The motor vehicle of claim 15 wherein the electronic processor is configured to indicate to the autonomous parking system which of the parking spaces has been selected by the user.

20. The motor vehicle of claim 15 wherein the touch-sensitive display screen is configured to enable the user of the motor vehicle to select the parking space in the processed images by touching an area on the screen that corresponds to the parking space that the user would like to select.

* * * * *